(12) United States Patent
Alastalo et al.

(10) Patent No.: US 9,403,926 B2
(45) Date of Patent: Aug. 2, 2016

(54) PROCESS FOR PRODUCING COPOLYMERS OF PROPYLENE

(71) Applicant: BOREALIS AG, Vienna (AT)

(72) Inventors: Kauno Alastalo, Porvoo (FI); Johanna Lilja, Porvoo (FI); Pauli Leskinen, Helsinki (FI)

(73) Assignee: BOREALIS AG, Vienna (AT)

( * ) Notice: Subject to any disclaimer, the term of this patent is extended or adjusted under 35 U.S.C. 154(b) by 5 days.

(21) Appl. No.: 14/758,117

(22) PCT Filed: Dec. 19, 2013

(86) PCT No.: PCT/EP2013/077274
§ 371 (c)(1),
(2) Date: Jun. 26, 2015

(87) PCT Pub. No.: WO2014/102128
PCT Pub. Date: Jul. 3, 2014

(65) Prior Publication Data
US 2015/0315313 A1 Nov. 5, 2015

(30) Foreign Application Priority Data

Dec. 28, 2012 (EP) .................................... 12199688

(51) Int. Cl.
| C08F 210/06 | (2006.01) |
| C08F 2/12 | (2006.01) |
| C08F 2/34 | (2006.01) |
| C08F 210/16 | (2006.01) |
| B01J 8/26 | (2006.01) |

(52) U.S. Cl.
CPC ............. *C08F 210/06* (2013.01); *C08F 210/16* (2013.01)

(58) Field of Classification Search
CPC ........... C08F 2/001; C08F 2/34; C08F 210/06
USPC ....................................... 525/53; 526/65, 916
See application file for complete search history.

(56) References Cited

U.S. PATENT DOCUMENTS

| 3,242,150 A | 3/1966 | Scoggin |
| 3,324,093 A | 6/1967 | Alleman |
| 3,374,211 A | 3/1968 | Marwil et al. |
| 3,405,109 A | 10/1968 | Rohlfing |
| 4,107,414 A | 8/1978 | Giannini et al. |
| 4,186,107 A | 1/1980 | Wagner |
| 4,226,963 A | 10/1980 | Giannini et al. |
| 4,347,160 A | 8/1982 | Epstein |
| 4,382,019 A | 5/1983 | Greco |
| 4,435,550 A | 3/1984 | Ueno et al. |
| 4,465,782 A | 8/1984 | McKenzie |
| 4,472,524 A | 9/1984 | Albizzati |
| 4,473,660 A | 9/1984 | Albizzati et al. |
| 4,522,930 A | 6/1985 | Albizzati et al. |
| 4,530,912 A | 7/1985 | Pullukat et al. |
| 4,532,311 A | 7/1985 | Fulks et al. |
| 4,532,313 A | 7/1985 | Matlack |
| 4,543,399 A | 9/1985 | Jenkins, III et al. |
| 4,560,671 A | 12/1985 | Gross et al. |
| 4,578,879 A | 4/1986 | Yokoyama et al. |
| 4,581,342 A | 4/1986 | Johnson et al. |
| 4,582,816 A | 4/1986 | Miro |
| 4,621,952 A | 11/1986 | Aronson |
| 4,657,882 A | 4/1987 | Karayannis et al. |
| 4,803,251 A | 2/1989 | Goode et al. |
| 4,855,370 A | 8/1989 | Chirillo et al. |
| 4,933,149 A | 6/1990 | Rhee et al. |
| 5,026,795 A | 6/1991 | Hogan |
| 5,391,654 A | 2/1995 | Ahvenainen et al. |
| 5,539,067 A | 7/1996 | Parodi et al. |
| 5,618,771 A | 4/1997 | Parodi et al. |
| 6,365,682 B1 * | 4/2002 | Alastalo ................. C08F 10/06 525/319 |

FOREIGN PATENT DOCUMENTS

| EP | 0045975 A2 | 2/1982 |
| EP | 0045976 A2 | 2/1982 |
| EP | 0045977 A2 | 2/1982 |
| EP | 0188125 A2 | 7/1986 |
| EP | 0250169 A2 | 12/1987 |
| EP | 0479186 A2 | 4/1992 |
| EP | 0560035 A1 | 9/1993 |
| EP | 0579426 A1 | 1/1994 |
| EP | 0600414 A1 | 6/1994 |
| EP | 0684871 A1 | 12/1995 |
| EP | 0696293 A1 | 2/1996 |
| EP | 0699213 A1 | 3/1996 |
| EP | 0707513 A1 | 4/1996 |
| EP | 0721798 A2 | 7/1996 |
| EP | 0887379 A1 | 12/1998 |
| EP | 0887380 A1 | 12/1998 |
| EP | 0887381 A1 | 12/1998 |
| EP | 0891990 A2 | 1/1999 |
| EP | 0991684 A1 | 4/2000 |
| EP | 1310295 A1 | 5/2003 |
| EP | 1415999 A1 | 5/2004 |
| EP | 1591460 A1 | 11/2005 |

(Continued)

OTHER PUBLICATIONS

Geldart et al., "The Design of Distributors for Gas-Fluidized Beds", Powder Technology, vol. 42, 1985.

(Continued)

*Primary Examiner* — Fred M Teskin
(74) *Attorney, Agent, or Firm* — Roberts Mlotkowski Safran Cole & Calderon, P.C.

(57) ABSTRACT

The present invention is directed to a process of polymerizing propylene in at least three stages. In the first, and optionally in the second, polymerization stage propylene, ethylene and at least one alpha-olefin having from 4 to 10 carbon atoms are introduced into the polymerization reactors as fresh monomer feeds. In the third polymerization stage propylene and optionally ethylene is introduced as fresh monomer feed.

31 Claims, No Drawings

(56) References Cited

FOREIGN PATENT DOCUMENTS

| | | | |
|---|---|---|---|
| EP | 1860125 A1 | 11/2007 | |
| EP | 1941997 A1 | 7/2008 | |
| EP | 2452960 A1 | 5/2012 | |
| EP | 2452975 A1 | 5/2012 | |
| GB | 1580635 A | 12/1980 | |
| WO | 8707620 A1 | 12/1987 | |
| WO | 9219653 A1 | 11/1992 | |
| WO | 9219658 A1 | 11/1992 | |
| WO | 9219659 A1 | 11/1992 | |
| WO | 9221705 A1 | 12/1992 | |
| WO | 9311165 A1 | 6/1993 | |
| WO | 9311166 A1 | 6/1993 | |
| WO | 9319100 A1 | 9/1993 | |
| WO | 9425495 A1 | 11/1994 | |
| WO | 9532994 A1 | 12/1995 | |
| WO | 9736939 A1 | 10/1997 | |
| WO | 9812234 A1 | 3/1998 | |
| WO | 9933842 A1 | 7/1999 | |
| WO | 0029452 A1 | 5/2000 | |
| WO | 03000754 A1 | 1/2003 | |
| WO | 03000755 A2 | 1/2003 | |
| WO | 03000756 A1 | 1/2003 | |
| WO | 03000757 A1 | 1/2003 | |
| WO | 2004029112 A1 | 4/2004 | |
| WO | 2005087361 A1 | 9/2005 | |
| WO | 2007025640 A1 | 3/2007 | |
| WO | 2008074699 A1 | 6/2008 | |
| WO | 2009019169 A1 | 2/2009 | |
| WO | 2009130092 A1 | 10/2009 | |
| WO | 2013041507 A1 | 3/2013 | |

OTHER PUBLICATIONS

Geldart, "Gas Fluidization Technology", J. Wiley & Sons, 1986.
International Search Report of PCT Application No. PCT/EP2013/077274 mailed Feb. 24, 2014.

* cited by examiner

PROCESS FOR PRODUCING COPOLYMERS OF PROPYLENE

FIELD OF THE INVENTION

The present invention is directed to a process for producing copolymers of propylene. Especially, the present invention is directed to an improved process for producing copolymers of propylene with at least two comonomers. In particular, the present invention is directed to an improved process for producing copolymers of propylene with ethylene and at least one alpha-olefin having from 4 to 10 carbon atoms where the content of unreacted comonomer within the copolymer is low.

PROBLEM TO BE SOLVED

The use of alpha-olefins containing 4 or more carbon atoms as comonomers with propylene is advantageous, as they are in some aspects advantageous to ethylene. The problem in such comonomers is that they are often less reactive than propylene and ethylene. Further, they are also less volatile. Thus, when the polymer is withdrawn from the polymerization process it often contains significant amount of unreacted alpha-olefin which may cause deterioration in organoleptic properties, such as offensive taste or odour or both. The removal of such residual hydrocarbon from the polymer requires additional purging stages or at least more intensive purging. During such process stages there is also an increased risk for forming explosive gas mixtures which is a process safety issue.

The present invention aims to provide a process for copolymerizing propylene with ethylene and at least one alpha-olefin comonomer having from 4 to 10 carbon atoms where the amount of unreacted comonomer in the polymer is reduced but where the polymer still has the advantageous properties characteristic for copolymers of propylene with alpha-olefins containing from 4 to 10 carbon atoms.

PRIOR ART

WO-A-2009019169 discloses a process where terpolymers of ethylene, propylene and 1-butene were produced in two interconnected gas phase polymerization zones. The process was reported to produce copolymers having a fixed ratio between ethylene and 1-butene units and a higher melting temperature for a given comonomer content compared to the copolymers produced by using prior art processes.

WO-A-2009130092 discloses that terpolymers of ethylene, propylene and 1-butene were produced in slurry in liquid propylene.

WO-A-2008074699 discloses that terpolymers of ethylene, propylene and 1-butene were produced in cascaded reactor system of two loop reactors and a gas phase reactor by gradually reducing the concentrations of ethylene and 1-butene in the feed to the loop reactors.

SUMMARY OF THE INVENTION

The present invention provides a process of copolymerizing propylene, ethylene and at least one alpha-olefin having from 4 to 10 carbon atoms in the presence of an olefin polymerization catalyst in three cascaded polymerization stages comprising the steps of:
(i) copolymerizing propylene, ethylene and the alpha-olefin having from 4 to 10 carbon atoms in a first polymerization stage by introducing a monomer mixture consisting of propylene, ethylene and at least one alpha-olefin having 4 to 10 carbon atoms, and said olefin polymerization catalyst into the first polymerization stage under conditions to polymerize propylene, ethylene and said at least one alpha-olefin on said olefin polymerization catalyst to produce a mixture comprising particles of a first copolymer of propylene and a first fluid reaction mixture;
(ii) withdrawing a first stream of the mixture comprising said particles of the first copolymer and said first fluid reaction mixture from the first polymerization stage and introducing it into a subsequent second polymerization stage;
(iii) introducing one first additional monomer mixture consisting of propylene, ethylene and optionally at least one alpha-olefin having 4 to 10 carbon atoms into the second polymerization stage to copolymerize propylene, ethylene and the alpha-olefin to produce a mixture comprising particles of a first copolymer mixture of said first copolymer and a second copolymer and a second fluid reaction mixture;
(iv) withdrawing a second stream of the mixture of said particles of the first copolymer mixture and said second fluid reaction mixture from the second polymerization stage and introducing it into a third polymerization stage;
(v) introducing one second additional monomer mixture consisting of propylene and optionally ethylene into the third polymerization stage conducted in gas phase in a fluidized bed to polymerize the monomers in said second additional monomer mixture optionally with residual alpha-olefin remaining in said second stream, in the third polymerization stage to produce particles of a second copolymer mixture of said first copolymer mixture and a third polymer where the particles of the second copolymer mixture are suspended in a third fluid reaction mixture in gas phase;
(vi) withdrawing a third stream comprising the second copolymer mixture and the third fluid reaction mixture from the third polymerization stage.

DETAILED DESCRIPTION

According to the present invention propylene is polymerized in at least three stages. In the first, and optionally in the second, polymerization stage propylene, ethylene and an alpha-olefin having from 4 to 10 carbon atoms are introduced into the polymerization reactors as fresh monomer feeds. In the third polymerization stage propylene, optionally together with ethylene, is introduced as a fresh monomer feed.

By additional monomer mixture is meant a fresh monomer feed into a polymerization stage. The first additional monomer mixture denotes the fresh monomer feed into the second polymerization stage and the second additional monomer mixture denotes the fresh monomer feed into the third polymerization stage.

By fresh monomer is meant monomer which has been introduced directly into a reactor so that the monomer has not passed via another reactor. Residual monomer, on the other hand, means monomer which is carried over from a previous polymerization stage.

Typically, the process conditions are adjusted such that the final polymer composition obtained by the process contains from 3 to 10% by weight by weight of units derived from alpha-olefin containing 4 to 10 carbon atoms, from 1 to 5% by weight of ethylene units and from 85 to 96% by weight of propylene units.

Preferably the alpha-olefin having from 4 to 10 carbon atoms is 1-butene, 1-hexene or 1-octene. Especially preferably the alpha-olefin having from 4 to 10 carbon atoms is 1-butene.

The final polymer composition preferably has a melt index $MFR_2$ of from 0.1 to 15 g/10 min, more preferably from 0.5 to 10 g/10 min. A more detailed description of the polymerization conditions is given below.

Catalyst

The polymerisation can be carried out in the presence of a metallocene catalyst or Ziegler-Natta-type catalyst, the latter is in particular preferred.

A Ziegler-Natta type catalyst typically used in the present invention for propylene polymerization is stereospecific, high yield Ziegler-Natta catalyst comprising as essential components Mg, Ti, Al and Cl. This type of catalysts comprise typically in addition to a solid transition metal (like Ti) component a cocatalyst(s) as well external donor(s) as stereoregulating agent.

These compounds may be supported on a particulate support, such as inorganic oxide, like silica or alumina, or, usually, the magnesium halide may form the solid support. It is also possible that solid catalysts are self supported, i.e. the catalysts are not supported on an external support, but are prepared via emulsion-solidification method.

The solid transition metal component usually also comprises an electron donor (internal electron donor). Suitable internal electron donors are, among others, esters of carboxylic acids, like phthalates, citraconates, and succinates. Also oxygen- or nitrogen-containing silicon compounds may be used.

The cocatalyst used in combination with the transition metal compound typically comprises an aluminium alkyl compound. The aluminium alkyl compound is preferably trialkyl aluminium such as trimethylaluminium, triethylaluminium, tri-isobutylaluminium or tri-n-octylaluminium. However, it may also be an alkylaluminium halide, such as diethylaluminium chloride, dimethylaluminium chloride and ethylaluminium sesquichloride. Triethylaluminium is an especially preferred aluminium alkyl compound. The aluminium alkyl is preferably introduced to reach a desired ratio of the aluminium to titanium. Suitable ratios depend on the catalyst and lie within the range of from 30 to 1000 mol/mol, such as 50 to 600 mol/mol.

Preferably the catalyst also comprises an external electron donor. Suitable electron donors known in the art include ethers, ketones, amines, alcohols, phenols, phosphines and silanes. Silane type external donors are typically organosilane compounds containing Si—OCOR, Si—OR, or Si—NR$_2$ bonds, having silicon as the central atom, and R is an alkyl, alkenyl, aryl, arylalkyl or cycloalkyl with 1-20 carbon atoms are known in the art. Organosilane compounds are preferred external donors, with dicyclopentyldimethoxysilane and cyclohexylmethyldimethoxysilane being especially preferred. The organosilane compound is typically introduced to keep a desired ratio aluminium alkyl and the silane compound, such as from 3 to 20, or from 4 to 10.

Examples of suitable catalysts and compounds in catalysts are shown in among others, in WO-A-87/07620, WO-A-92/21705, WO-A-93/11165, WO-A-93/11166, WO-A-93/19100, WO-A-97/36939, WO-A-98/12234, WO-A-99/33842, WO-A-03/000756, WO-A-03/000757, WO-A-03/000754, WO-A-03/000755, WO-A-2004/029112, WO-A-92/19659, WO-A-92/19653, WO-A-92/19658, U.S. Pat. No. 4,382,019, U.S. Pat. No. 4,435,550, U.S. Pat. No. 4,465,782, U.S. Pat. No. 4,473,660, U.S. Pat. No. 4,560,671, U.S. Pat. No. 5,539,067, U.S. Pat. No. 5,618,771, EP-A-45975, EP-A-45976, EP-A-45977, WO-A-95/32994, U.S. Pat. No. 4,107,414, U.S. Pat. No. 4,186,107, U.S. Pat. No. 4,226,963, U.S. Pat. No. 4,347,160, U.S. Pat. No. 4,472,524, U.S. Pat. No. 4,522,930, U.S. Pat. No. 4,530,912, U.S. Pat. No. 4,532,313, U.S. Pat. No. 4,657,882, U.S. Pat. No. 4,581,342, U.S. Pat. No. 4,657,882.

Prepolymerization

In a preferred embodiment, the prepolymerization is conducted in a continuous manner as bulk slurry polymerization in liquid propylene, i.e. the liquid phase mainly comprises propylene, with minor amount of other reactants and optionally inert components dissolved therein. Preferably the prepolymerization is conducted in a continuous stirred tank reactor or a loop reactor.

The prepolymerization reaction is typically conducted at a temperature of 0 to 60° C., preferably from 10 to 50° C.

The pressure in the prepolymerization reactor is not critical but must be sufficiently high to maintain the reaction mixture in liquid phase. Thus, the pressure may be from 20 to 100 bar, for example 30 to 70 bar.

The reaction conditions are well known in the art as disclosed, among others, in GB-A-1580635.

In the prepolymerization step it is also possible to feed comonomers into the prepolymerization stage. Examples of suitable comonomers are ethylene or alpha-olefins having from 4 to 10 carbon atoms. Especially suitable comonomers are ethylene, 1-butene, 1-hexene, 1-octene or their mixtures.

First Polymerization Stage

In the first polymerization stage a first copolymer of propylene, ethylene and at least one alpha-olefin containing 4 to 10 carbon atoms is produced. This is done by introducing a polymerization catalyst, optionally through the prepolymerization stage as disclosed above, into the first polymerization stage together with a first monomer mixture containing propylene, ethylene and at least one alpha-olefin containing 4 to 10 carbon atoms. The contents of the different monomers are controlled to obtain the desired contents of the monomeric constituents in the first copolymer. Typically the first copolymer contains from 5 to 15% by weight of units derived from alpha-olefin(s) containing 4 to 10 carbon atoms, from 0.1 to 3% by weight of ethylene units and from 82 to 94.9% by weight of propylene units. Preferably the first copolymer contains from 6 to 12% by weight of units derived from alpha-olefin(s) containing 4 to 10 carbon atoms, from 0.5 to 2% by weight of ethylene units and from 86 to 93.5% by weight of propylene units.

The first copolymer is a semicrystalline copolymer of propylene and thus not amorphous. It preferably has a fraction of xylene soluble material of from 2 to 10%, more preferably from 2 to 5% by weight.

The polymerization in the first polymerization zone is preferably conducted in slurry. Then the polymer particles formed in the polymerization, together with the catalyst fragmented and dispersed within the particles, are suspended in the fluid hydrocarbon. The slurry is agitated to enable the transfer of reactants from the fluid into the particles.

Slurry polymerization is preferably a so called bulk polymerization. By "bulk polymerization" is meant a process where the polymerization is conducted in a liquid monomer essentially in the absence of an inert diluent. However, as it is known to a person skilled in the art the monomers used in commercial production are never pure but always contain aliphatic hydrocarbons as impurities. For instance, the propylene monomer may contain up to 5% of propane as an impurity. As propylene is consumed in the reaction and also recycled from the reaction effluent back to the polymerization, the inert components tend to accumulate, and thus the reaction medium may comprise up to 40 wt-% of other compounds than monomer. It is to be understood, however, that such a polymerization process is still within the meaning of "bulk polymerization", as defined above.

The temperature in the slurry polymerization is typically from 50 to 110° C., preferably from 60 to 100° C. and in particular from 65 to 95° C. The pressure is from 1 to 150 bar, preferably from 10 to 100 bar.

The slurry polymerization may be conducted in any known reactor used for slurry polymerization. Such reactors include a continuous stirred tank reactor and a loop reactor. It is especially preferred to conduct the polymerization in loop reactor. In such reactors the slurry is circulated with a high velocity along a closed pipe by using a circulation pump. Loop reactors are generally known in the art and examples are given, for instance, in U.S. Pat. No. 4,582,816, U.S. Pat. No. 3,405,109, U.S. Pat. No. 3,324,093, EP-A-479186 and U.S. Pat. No. 5,391,654.

The slurry may be withdrawn from the reactor either continuously or intermittently. A preferred way of intermittent withdrawal is the use of settling legs where the solids concentration of the slurry is allowed to increase before withdrawing a batch of the concentrated slurry from the reactor. The use of settling legs is disclosed, among others, in U.S. Pat. No. 3,374,211, U.S. Pat. No. 3,242,150 and EP-A-1310295. Continuous withdrawal is disclosed, among others, in EP-A-891990, EP-A-1415999, EP-A-1591460 and EP-A-1860125. The continuous withdrawal may be combined with a suitable concentration method, as disclosed in EP-A-1860125 and EP-A-1591460.

Into the slurry polymerization stage other components may also be introduced as it is known in the art. Thus, hydrogen can be used to control the molecular weight of the polymer. Process additives may also be introduced into the reactor to facilitate a stable operation of the process.

When the slurry polymerization stage is followed by a gas phase polymerization stage it is preferred to conduct the slurry directly into the gas phase polymerization zone without a flash step between the stages. This kind of direct feed is described in EP-A-887379, EP-A-887380, EP-A-887381 and EP-A-991684.

When the first polymerization stage is conducted as slurry polymerization in a loop reactor it has been found that if the first monomer mixture contains from 0.05 to 2.0% by weight of ethylene, from 5 to 40% by weight of alpha-olefin(s) containing 4 to 10 carbon atoms and from 95 to 58% by weight of propylene good results are obtained. However, for other types of polymerization process different monomer mixture compositions may be required.

Second Polymerization Stage

In the second polymerization stage a first copolymer mixture comprising the first copolymer and a second copolymer is formed. This is done by introducing the particles of the first copolymer, containing active catalyst dispersed therein, and a second monomer mixture into the second polymerization stage. This causes the second copolymer to form on the particles containing the first copolymer.

The first additional monomer mixture preferably contains propylene, ethylene and at least one alpha-olefin containing 4 to 10 carbon atoms. Also in the second polymerization stage the contents of the different monomers are controlled to obtain the desired contents of the monomeric constituents in the first copolymer mixture. Typically the first copolymer mixture contains from 4 to 12% by weight by weight of units derived from alpha-olefin containing 4 to 10 carbon atoms, from 0.5 to 5% by weight of ethylene units and from 83 to 95.5% by weight of propylene units. Preferably the first copolymer mixture contains from 5 to 8% by weight of units derived from alpha-olefin(s) containing 4 to 10 carbon atoms, from 0.5 to 2% by weight of ethylene units and from 90 to 94.5% by weight of propylene units.

The first copolymer mixture preferably comprises from 40 to 60% by weight of the first copolymer and from 60 to 40% by weight of the second copolymer.

The second copolymer of propylene is a semicrystalline copolymer and thus not amorphous. Second copolymer preferably has a fraction of polymer soluble in xylene of from 2 to 10%, more preferably from 4 to 8% by weight.

In some cases it is not necessary for the first additional monomer mixture to contain the alpha-olefin containing 4 to 10 carbon atoms. This can be the case, for instance, when the reaction mixture carried over from the first polymerization stage contains a sufficient amount of the alpha-olefin to reach the desired product properties. This can be the case when the first polymerization stage was conducted in slurry and the slurry is directly transferred to the second polymerization stage without removing the reaction mixture from the polymer. However, there are many instances where the first additional monomer mixture needs to contain the alpha-olefin containing from 4 to 10 carbon atoms.

In a preferred embodiment where the second polymerization stage is conducted in a fluidized bed gas phase reactor the composition of the first additional monomer mixture is adjusted so that the fluidization gas has a ratio of ethylene to propylene of about 5 to 50 mol/kmol (or, mol/1000 mol), a ratio of the alpha-olefin to propylene of about 100 to 300 mol/kmol and contains from 50 to 95 mol-% propylene.

The second polymerization stage is preferably conducted in gas phase by polymerizing the monomers in a fluidized bed. In a fluidized bed gas phase reactor an olefin is polymerized in the presence of a polymerization catalyst in an upwards moving gas stream. The reactor typically contains a fluidized bed comprising the growing polymer particles containing the active catalyst, said fluidized bed having its base above a fluidization grid.

The polymer bed is fluidized with the help of the fluidization gas comprising the olefin monomer, eventual comonomer(s), eventual chain growth controllers or chain transfer agents, such as hydrogen, and eventual inert gas. The fluidization gas is introduced into an inlet chamber at the bottom of the reactor. To make sure that the gas flow is uniformly distributed over the cross-sectional surface area of the inlet chamber the inlet pipe may be equipped with a flow dividing element as known in the art, e.g. U.S. Pat. No. 4,933,149 and EP-A-684871. One or more of the above-mentioned components may be continuously added into the fluidization gas to compensate for losses caused, among other, by reaction or product withdrawal.

From the inlet chamber the gas flow is passed upwards through a fluidization grid into the fluidized bed. The purpose of the fluidization grid is to divide the gas flow evenly through the cross-sectional area of the bed. Sometimes the fluidization grid may be arranged to establish a gas stream to sweep along the reactor walls, as disclosed in WO-A-2005/087361. Other types of fluidization grids are disclosed, among others, in U.S. Pat. No. 4,578,879, EP-A-600414 and EP-A-721798. An overview is given in Geldart and Bayens: The Design of Distributors for Gas-fluidized Beds, Powder Technology, Vol. 42, 1985.

The fluidization gas passes through the fluidized bed. The superficial velocity of the fluidization gas must be higher that minimum fluidization velocity of the particles contained in the fluidized bed, as otherwise no fluidization would occur. On the other hand, the velocity of the gas should be lower than the onset velocity of pneumatic transport, as otherwise the whole bed would be entrained with the fluidization gas. The minimum fluidization velocity and the onset velocity of pneumatic transport can be calculated when the particle characteristics are known by using common engineering practise. An overview is given, among others in Geldart: Gas Fluidization Technology, J. Wiley & Sons, 1986.

When the fluidization gas is contacted with the bed containing the active catalyst the reactive components of the gas, such as monomers and chain transfer agents, react in the presence of the catalyst to produce the polymer product. At the same time the gas is heated by the reaction heat.

The unreacted fluidization gas is removed from the top of the reactor and cooled in a heat exchanger to remove the heat of reaction. The gas is cooled to a temperature which is lower than that of the bed to prevent the bed from heating because of the reaction. It is possible to cool the gas to a temperature where a part of it condenses. When the liquid droplets enter the reaction zone they are vaporised. The vaporisation heat then contributes to the removal of the reaction heat. This kind of operation is called condensed mode and variations of it are disclosed, among others, in WO-A-2007/025640, U.S. Pat. No. 4,543,399, EP-A-699213 and WO-A-94/25495. It is also possible to add condensing agents into the recycle gas stream, as disclosed in EP-A-696293. The condensing agents are non-polymerizable components, such as n-pentane, isopentane, n-butane or isobutane, which are at least partially condensed in the cooler.

The gas is then compressed and recycled into the inlet chamber of the reactor. Prior to the entry into the reactor fresh reactants are introduced into the fluidization gas stream to compensate for the losses caused by the reaction and product withdrawal. It is generally known to analyze the composition of the fluidization gas and introduce the gas components to keep the composition constant. The actual composition is determined by the desired properties of the product and the catalyst used in the polymerization.

The polymeric product may be withdrawn from the gas phase reactor either continuously or intermittently. Combinations of these methods may also be used. Continuous withdrawal is disclosed, among others, in WO-A-00/29452. Intermittent withdrawal is disclosed, among others, in U.S. Pat. No. 4,621,952, EP-A-188125, EP-A-250169 and EP-A-579426.

The top part of the gas phase reactor may include a so called disengagement zone. In such a zone the diameter of the reactor is increased to reduce the gas velocity and allow the particles that are carried from the bed with the fluidization gas to settle back to the bed.

The bed level may be observed by different techniques known in the art. For instance, the pressure difference between the bottom of the reactor and a specific height of the bed may be recorded over the whole length of the reactor and the bed level may be calculated based on the pressure difference values. Such a calculation yields a time-averaged level. It is also possible to use ultrasonic sensors or radioactive sensors. With these methods instantaneous levels may be obtained, which of course may then be averaged over time to obtain a time-averaged bed level.

Also antistatic agent(s) may be introduced into the gas phase reactor if needed. Suitable antistatic agents and methods to use them are disclosed, among others, in U.S. Pat. No. 5,026,795, U.S. Pat. No. 4,803,251, U.S. Pat. No. 4,532,311, U.S. Pat. No. 4,855,370 and EP-A-560035. They are usually polar compounds and include, among others, water, ketones, aldehydes and alcohols.

The reactor may also include a mechanical agitator to further facilitate mixing within the fluidized bed. An example of suitable agitator design is given in EP-A-707513.

Typically the fluidized bed polymerization reactor is operated at a temperature within the range of from 50 to 100° C., preferably from 65 to 90° C. The pressure is suitably from 10 to 40 bar, preferably from 15 to 30 bar.

Third Polymerization Stage

In the third polymerization stage a second copolymer mixture comprising the first copolymer mixture and a third polymer is formed. This is done by introducing the mixture of the particles comprising the first copolymer mixture and the second fluid reaction mixture, together with a second additional monomer mixture, into the third polymerization stage. This causes the third polymer to form on the particles containing the first copolymer mixture.

The third polymerization stage is conducted in a fluidized bed gas phase reactor. The monomer is in vapour phase around the polymer particles and accesses the active catalyst contained in the particles. Further, heavier comonomers, such as the alpha-olefins having from 4 to 10 carbon atoms, are not completely vaporized but are at least partly condensed on the polymer particles where they can easily access the active sites of the catalyst.

For this reason no additional feed of the alpha-olefin comonomer having from 4 to 10 carbon atoms takes place. All the alpha-olefin having 4 to 10 carbon atoms enters the third polymerization stage with the first copolymer mixture from the preceding polymerization stage.

The second additional monomer mixture contains propylene and preferably also ethylene. Also in the third polymerization stage the contents of the monomers are controlled to obtain the desired contents of the monomeric constituents in the second copolymer mixture. As explained above, even though no fresh alpha-olefin having 4 to 10 carbon atoms is introduced into the third polymerization stage, the third copolymer produced therein is still a ternary copolymer of propylene, ethylene and said alpha-olefin. Typically the second copolymer mixture contains from 3 to 10% by weight by weight of units derived from alpha-olefin containing 4 to 10 carbon atoms, from 1 to 5% by weight of ethylene units and from 85 to 96% by weight of propylene units. Preferably the second copolymer mixture contains from 6 to 8% by weight of units derived from alpha-olefin(s) containing 4 to 10 carbon atoms, from 1 to 2% by weight of ethylene units and from 90 to 93% by weight of propylene units.

The second copolymer mixture preferably contains from 75 to 96% by weight, more preferably from 80 to 95% by weight, of the first copolymer mixture and from 4 to 25% by weight, more preferably from 5 to 20% by weight of the third polymer.

The third polymer of propylene is a semicrystalline polymer and thus not amorphous. The third polymer preferably has a fraction of polymer soluble in xylene of from 2 to 10%, more preferably from 4 to 8% by weight.

As discussed above, the third polymer is preferably a third copolymer because residual comonomer from the second polymerization stage is carried over to the third polymerization stage together with the polymer. Furthermore, it is preferred to feed additional ethylene together with propylene into the third polymerization stage. Preferably the second additional monomer mixture consists of from 93 to 99.5% by weight of propylene and from 0.5 to 7% by weight of ethylene.

Purging

It is preferred to purge the polymer to reduce the amount of residual hydrocarbons in the polymer. Typically the purging step is conducted in a purge vessel where the polymer is contacted with a purge gas. The temperature during the purging step is from 30 to 110° C., preferably from 30 to 95° C.

and more preferably from 40 to 80° C. The average residence time is from 5 to 240 minutes, preferably from 10 to 200 minutes.

Preferably the purging step is conducted continuously. In a preferred embodiment the polymer particles are introduced to the top of the purge vessel and removed from the bottom. Thereby a downward flow of polymer particles is established. The purge gas is typically introduced at the bottom of the purge vessel so as to achieve a counter-current flow of particles and gas.

The purge gas preferably contains an inert gas, such as nitrogen, or a gas capable of deactivating the catalyst, such as steam, or a mixture thereof. An especially preferred purge gas is nitrogen, optionally containing up to 5% steam.

The gas flow is selected so that no fluidization of the polymer particles occurs in the purge vessel. Thereby a narrow residence time distribution of the polymer particles is obtained and the process has a good efficiency.

Extrusion

The polymer particles are mixed with additives and extruded to pellets as it is known in the art. Preferably co-rotating twin screw extruder is used for the extrusion step. Such extruders are manufactured, for instance, by Coperion (Werner & Pfleiderer) and Japan Steel Works.

Description of Methods

Determination of Volatile Compounds

The volatile components as described above were determined by using a gas chromatograph and a headspace method. The equipment was a Hewlett Packard gas chromatograph with a 25 m×0.32 mm×2.5 μm (length×diameter×size of packing material) non-polar column filled with DB-1 (100% dimethyl polysiloxane). A flame ionisation detector was used with hydrogen as a fuel gas. Helium at 10 psi was used as a carrier gas with a flow rate of 3 ml/min. After the injection of the sample the oven temperature was maintained at 50° C. for 3 minutes, after which it was increased at a rate of 12° C./min until it reached 200° C. Then the oven was maintained at that temperature for 4 minutes, after which the analysis was completed.

The calibration was carried out as follows: At least three and preferably from five to ten reference solutions were prepared, containing from 0.1 to 100 g of n-octane dissolved in 1 liter of dodecane. The concentration of octane in the reference solutions should be in the same area as the range of the volatiles in the samples to be analysed. 4 μl of each solution was injected into a 20 ml injection flask, which was thermostated to 120° C. and analysed. A calibration factor Rf for the area under the n-octane peak, A, vs. the amount of n-octane in the solution in μg, C, was thus obtained as Rf=C/A.

The analysis was conducted as follows: The polymer sample (about 2 grams) was placed in the 20 ml injection flask, which was thermostated to 120° C. and kept at that temperature for one hour. A gas sample from the injection flask was then injected into the GC. Before the analysis, a blind run was conducted, where an injection from an empty flask was made. The hydrocarbon emission E was then calculated as follows: E=AT·Rf/W·1000000, where E is the hydrocarbon emission as μg volatile compounds per gram of sample, AT is the total area under the sample peaks in area counts, Rf is the calibration factor for n-octane in μg per area count, and W is the weight of the sample in grams.

Melt Flow Rate

Melt flow rate (MFR, $MFR_2$) was determined according to ISO 1133 at 230° C. under the load of 2.16 kg.

Content of Ethylene

Ethylene content in propylene polymer was measured by Fourier transmission infrared spectroscopy (FTIR). A thin film of the sample (thickness approximately 250 μm) was prepared by hot-pressing. The area of —$CH_2$- absorption peak (800-650 $cm^{-1}$) was measured with Perkin Elmer FTIR 1600-spectrometer. The method was calibrated by ethylene content data measured by $^{13}C$ NMR.

Content of 1-Butene

The 1-butene content was measured by using FTIR according to the procedure described above. The butene content was determined from the peak at 767 $cm^{-1}$. The base line was determined between wave numbers 780 and 750 $cm^{-1}$. The 1-butene content was calculated as $w_B$=B·(A/ΔAbs)+C, where $w_B$ is the content of 1-butene in weight-%, A and B are constants obtained from calibration, A is the area under the 1-butene peak at 767 $cm^{-1}$ and ΔAbs is the difference between the absorbance of the reference peaks at 4323 and 4700 $cm^{-1}$, or A(4323 $cm^{-1}$)–A(4700 $cm^{-1}$).

Xylene Soluble

The amount of xylene soluble fraction was determined according to ISO 16152.

EXAMPLES

Catalyst Preparation

First, 0.1 mol of $MgCl_2$×3 EtOH was suspended under inert conditions in 250 ml of decane in a reactor at atmospheric pressure. The solution was cooled to the temperature of –15° C. and 300 ml of cold $TiCl_4$ was added while maintaining the temperature at said level. Then, the temperature of the slurry was increased slowly to 20° C. At this temperature, 0.02 mol of dioctylphthalate (DOP) was added to the slurry. After the addition of the phthalate, the temperature was raised to 135° C. during 90 minutes and the slurry was allowed to stand for 60 minutes. Then, another 300 ml of $TiCl_4$ was added and the temperature was kept at 135° C. for 120 minutes. After this, the catalyst was filtered from the liquid and washed six times with 300 ml heptane at 80° C. Then, the solid catalyst component was filtered and dried.

Comparative Example 1

A stirred tank reactor having a volume of 45 $dm^3$ was operated as liquid-filled at a temperature of 27° C. and a pressure of 49 bar. Into the reactor was fed propylene so much that the average residence time in the reactor was 0.3 hours together with 1.5 g/h hydrogen and 0.7 g/h of polymerization catalyst prepared according to Catalyst Preparation Example above with triethyl aluminium (TEA) as a cocatalyst and dicyclopentyldimethoxysilane (DCPDMS) as external donor so that the molar ratio of TEA/Ti was about 570 and TEA/DCPDMS was 4.7. The slurry from this prepolymerization reactor was directed to a loop reactor having a volume of 150 $dm^3$ together with 160 kg/h of propylene. The loop reactor was operated at a temperature of 70° C. and a pressure of 49 bar. Ethylene and 1-butene were introduced at feed rates of 0.4 and 45 kg/h, respectively. Hydrogen was introduced so that the ratio of hydrogen to propylene was 5.4 mol/kmol. The production rate of propylene copolymer was 30 kg/h, the melt flow rate $MFR_2$ was 11 g/10 min and the contents of ethylene and 1-butene units in the copolymer were 0.1 and 8% by weight, respectively.

The polymer slurry from the loop reactor was directly conducted into a first gas phase reactor operated at a temperature of 79° C. and a pressure of 19 bar. Into the reactor were fed additional propylene, ethylene, 1-butene and hydrogen, as well as nitrogen as an inert gas, so that the content of propylene was 50% by mole and the ratio of hydrogen to propylene was 41 mol/kmol, ethylene to propylene was 55 mol/kmol and 1-butene to propylene 190 mol/kmol. The production rate in the reactor was 15 kg/h and the polymer withdrawn from the reactor had a melt flow rate MFR$_2$ of 6.4 g/10 min and a content of ethylene and 1-butene units in the copolymer of 2.0 and 8.6% by weight, respectively.

The reaction mixture from the first gas phase reactor was introduced into a purge bin where a settled bed of copolymer was purged with a purge gas containing nitrogen and steam. The average residence time of the polymer in the purge bin was 30 minutes at a temperature of 60° C.

The polymer withdrawn from the reactor was mixed with effective amounts of Irgafos 168, Irganox 1010 and hydrotalcite. The mixture of polymer and additives was then extruded to pellets by using a ZSK70 extruder (product of Coperion) under nitrogen atmosphere.

Comparative Example 2

A stirred tank reactor having a volume of 45 dm$^3$ was operated as liquid-filled at a temperature of 28° C. and a pressure of 52 bar. Into the reactor was fed propylene so much that the average residence time in the reactor was 0.3 hours together with 2.0 g/h hydrogen and 1.4 g/h of polymerization catalyst prepared according to Catalyst Preparation Example above with triethyl aluminium (TEA) as a cocatalyst and dicyclopentyldimethoxysilane (DCPDMS) as external donor so that the molar ratio of TEA/Ti was about 460 and TEA/DCPDMS was 6. The slurry from this prepolymerization reactor was directed to a loop reactor having a volume of 150 dm$^3$ together with 150 kg/h of propylene. The loop reactor was operated at a temperature of 67° C. and a pressure of 51 bar. Ethylene and 1-butene were introduced at feed rates of 0.7 and 40 kg/h, respectively. Hydrogen was introduced so that the ratio of hydrogen to propylene was 5.7 mol/kmol. The production rate of propylene copolymer was 30 kg/h, the melt flow rate MFR$_2$ was 7 g/10 min and the contents of ethylene and 1-butene units in the copolymer were 0.45 and 9.8% by weight, respectively.

The polymer slurry from the loop reactor was directly conducted into a first gas phase reactor operated at a temperature of 79° C. and a pressure of 19 bar. Into the reactor were fed additional propylene, ethylene, 1-butene and hydrogen, as well as nitrogen as an inert gas, so that the content of propylene was 72% by mole and the ratio of hydrogen to propylene was 90 mol/kmol, ethylene to propylene was 19 mol/kmol and 1-butene to propylene 185 mol/kmol. The production rate in the reactor was 42 kg/h and the polymer withdrawn from the reactor had a melt flow rate MFR$_2$ of 6.1 g/10 min and a content of ethylene and 1-butene units in the copolymer of 1.6 and 8.0% by weight, respectively.

The reaction mixture from the first gas phase reactor was introduced into a purge bin where a settled bed of copolymer was purged with a purge gas containing nitrogen and steam. The average residence time of the polymer in the purge bin was 30 minutes at a temperature of 60° C.

The polymer withdrawn from the reactor was mixed with effective amounts of Irgafos 168, Irganox 1010 and hydrotalcite. The mixture of polymer and additives was then extruded to pellets by using a ZSK70 extruder (product of Coperion) under nitrogen atmosphere.

Example 1

A stirred tank reactor having a volume of 45 dm$^3$ was operated as liquid-filled at a temperature of 28° C. and a pressure of 52 bar. Into the reactor was fed propylene so much that the average residence time in the reactor was 0.3 hours together with 2.0 g/h hydrogen and 1.3 g/h of polymerization catalyst prepared according to Catalyst Preparation Example above with triethyl aluminium (TEA) as a cocatalyst and dicyclopentyldimethoxysilane (DCPDMS) as external donor so that the molar ratio of TEA/Ti was about 470 and TEA/DCPDMS was 6. The slurry from this prepolymerization reactor was directed to a loop reactor having a volume of 150 dm$^3$ together with 150 kg/h of propylene. The loop reactor was operated at a temperature of 67° C. and a pressure of 51 bar. The ratio of hydrogen to propylene was 5.8 mol/kmol. Into the reactor were introduced 0.9 kg/h of ethylene and 40 kg/h 1-butene. The production rate of propylene copolymer was 32 kg/h, the melt flow rate MFR$_2$ was 7.4 g/10 min and the contents of ethylene and 1-butene units in the copolymer were 1.1 and 9.0% by weight, respectively.

The polymer slurry from the loop reactor was directly conducted into a first gas phase reactor operated at a temperature 70° C. and a pressure of 27 bar. Into the reactor were fed additional propylene, ethylene, 1-butene and hydrogen, as well as nitrogen as an inert gas, so that the content of propylene was 70% by mole. The ratio of hydrogen to propylene was 116 mol/kmol, ethylene to propylene was 21 mol/kmol and 1-butene to propylene 185 mol/kmol. The production rate in the reactor was 39 kg/h and the polymer withdrawn from the reactor had a melt flow rate MFR$_2$ of 6.0 g/10 min and a content of ethylene and 1-butene units in the copolymer of 1.3 and 7.8% by weight, respectively.

The reaction mixture from the first gas phase reactor was introduced into a second gas phase reactor operated at a temperature of 70° C. and a pressure of 25 bar together with additional propylene and nitrogen. The content of propylene was 69% by mole and the ratio of ethylene to propylene was 34 mol/kmol. The production rate in the reactor was 6.3 kg/h.

The reaction mixture from the second gas phase reactor was introduced into a purge bin where a settled bed of copolymer was purged with a purge gas containing nitrogen and steam. The average residence time of the polymer in the purge bin was 30 minutes at a temperature of 60° C.

The polymer withdrawn from the reactor was mixed with effective amounts of Irgafos 168, Irganox 1010 and hydrotalcite. The mixture of polymer and additives was then extruded to pellets by using a ZSK70 extruder (product of Coperion) under nitrogen atmosphere.

The final pelletized polymer had a melt flow rate MFR$_2$ of 5.4 g/10 min and a content of ethylene and 1-butene units in the copolymer of 1.4 and 6.6% by weight, respectively.

Examples 2 to 3

The procedure of Example 1 was repeated except that the conditions were changed as shown in Table 1.

A sample was taken after the purging step of polymer powders of Comparative Example 2 and Example 3. The volatiles were analyzed according to the method described above and the results are shown in Table 2.

TABLE 1

Polymerization conditions and polymer properties

| | CE1 | CE2 | E1 | E2 | E3 |
|---|---|---|---|---|---|
| TEA/Ti | 570 | 460 | 470 | 430 | 350 |
| TEA/DCPDMS | 4.7 | 6.0 | 6.0 | 6.0 | 5.3 |
| 1: Loop reactor | | | | | |
| Propylene feed, kg/h | 160 | 150 | 150 | 150 | 140 |
| Ethylene feed, kg/h | 0.4 | 0.7 | 0.9 | 0.9 | 1.0 |

TABLE 1-continued

Polymerization conditions and polymer properties

|  | CE1 | CE2 | E1 | E2 | E3 |
|---|---|---|---|---|---|
| 1-butene feed, kg/h | 45 | 40 | 40 | 40 | 40 |
| H2/C3, mol/kmol | 5.4 | 5.7 | 5.8 | 5.7 | 6.2 |
| Production rate, kg/h | 30 | 30 | 32 | 31 | 29 |
| MFR$_2$, g/10 min | 11 | 7.0 | 7.4 | 7.9 | 7.2 |
| C2-content, % | 0.1 | 0.5 | 1.1 | 0.8 | 1.0 |
| C4-content, % | 8.0 | 9.8 | 9.0 | 7.9 | 10.5 |
| XS, % | 9.1 | 7.4 | 4.6 | 2.9 | 4.0 |
| 2: 1$^{st}$ gas phase reactor | | | | | |
| Propylene feed, kg/h | 46 | 80 | 80 | 80 | 80 |
| Ethylene feed, kg/h | 3.4 | 2.4 | 2.8 | 2.8 | 2.9 |
| Propylene concentration, mol-% | 50 | 72 | 70 | 70 | 70 |
| H2/C3, mol/kmol | 41 | 90 | 116 | 111 | 116 |
| C2/C3, mol/kmol | 55 | 19 | 21 | 23 | 23 |
| C4/C3, mol/kmol | 190 | 185 | 185 | 185 | 185 |
| Production rate, kg/h | 37 | 41 | 39 | 38 | 36 |
| Split, 1:2 | 45:55 | 43:57 | 45:55 | 45:55 | 45:55 |
| MFR$_2$, g/10 min | 8.4 | 6.7 | 6.0 | 6.7 | 6.7 |
| C2-content, % | 2.0 | 1.1 | 1.3 | 1.6 | 1.6 |
| C4-content, % | 8.6 | 9.1 | 7.8 | 8.1 | 8.0 |
| XS, % | 10.1 | 6.0 | 5.2 | 5.8 | 5.6 |
| 3: 2$^{nd}$ gas phase reactor | | | | | |
| Propylene feed, kg/h | | | 80 | 80 | 80 |
| Ethylene feed, kg/h | | | 1.8 | 1.4 | 0.8 |
| C2/C3, mol/kmol | | | 34 | 35 | 34 |
| Production rate, kg/h | | | 6.3 | 13 | 14 |
| Split, (1 + 2):3 | | | 92:8 | 85:15 | 83:17 |
| MFR$_2$, g/10 min | | | 5.8 | 5.9 | 6.3 |
| Final polymer | | | | | |
| MFR$_2$, g/10 min | 6.1 | 6.5 | 5.3 | 5.7 | 6.0 |
| C2-content, % | 2.0 | 1.3 | 1.5 | 1.7 | 1.8 |
| C4-content, % | 8.0 | 8.0 | 7.4 | 7.7 | 7.1 |
| XS, % | 9.1 | 4.8 | 5.6 | 7.5 | 6.8 |

TABLE 2

Volatile contents of the polymer samples:

|  | CE2 | E2 |
|---|---|---|
| Amount of volatiles, μg/g | 3100 | 1400 |

The invention claimed is:

1. A process of copolymerizing propylene, ethylene and at least one alpha-olefin having from 4 to 10 carbon atoms in the presence of an olefin polymerization catalyst in three cascaded polymerization stages comprising the steps of:
   (i) copolymerizing propylene, ethylene and the alpha-olefin having from 4 to 10 carbon atoms in a first polymerization stage by introducing a first monomer mixture consisting of propylene, ethylene and at least one alpha-olefin having from 4 to 10 carbon atoms, and said olefin polymerization catalyst into the first polymerization stage under conditions to polymerize propylene, ethylene and said at least one alpha-olefin on said olefin polymerization catalyst to produce a mixture comprising particles of a first copolymer of propylene and a first fluid reaction mixture;
   (ii) withdrawing a first stream of the mixture comprising said particles of the first copolymer and said first fluid reaction mixture from the first polymerization stage and introducing it into a subsequent second polymerization stage;
   (iii) introducing one first additional monomer mixture consisting of propylene, ethylene and optionally at least one alpha-olefin having from 4 to 10 carbon atoms into the second polymerization stage to copolymerize propylene, ethylene and the alpha-olefin to produce a mixture comprising particles of a first copolymer mixture of said first copolymer and a second copolymer and a second fluid reaction mixture;
   (iv) withdrawing a second stream of the mixture of said particles of the first copolymer mixture and said second fluid reaction mixture from the second polymerization stage and introducing it into a third polymerization stage;
   (v) introducing one second additional monomer mixture consisting of propylene and optionally ethylene into the third polymerization stage conducted in gas phase in a fluidized bed to polymerize the monomers in said second additional monomer mixture optionally with residual alpha-olefin remaining in said second stream in the third polymerization stage to produce particles of a second copolymer mixture of said first copolymer mixture and a third polymer where the particles of the second copolymer mixture are suspended in a third fluid reaction mixture in gas phase;
   (vi) withdrawing a third stream comprising the second copolymer mixture and the third fluid reaction mixture from the third polymerization stage.

2. The process according to claim 1 wherein the contents of propylene, ethylene and the alpha-olefin having from 4 to 10 carbon atoms in the first polymerization stage are adjusted so that the first copolymer contains from 5 to 15% by weight of units derived from alpha-olefin having from 4 to 10 carbon atoms, from 0.1 to 3% by weight of ethylene units and from 82 to 94.9% by weight of propylene units.

3. The process according to claim 1 wherein the contents of propylene, ethylene and the alpha-olefin having from 4 to 10 carbon atoms in the second polymerization stage are adjusted so that the first copolymer mixture contains from 4 to 12% by weight by weight of units derived from alpha-olefin having from 4 to 10 carbon atoms, from 0.5 to 5% by weight of ethylene units and from 83 to 95.5% by weight of propylene units.

4. The process according to claim 1 wherein the first copolymer mixture contains from 40 to 60% by weight of said first copolymer and from 60 to 40% by weight of said second copolymer.

5. The process according to claim 1 wherein the contents of propylene and ethylene in the third polymerization stage are adjusted so that the second copolymer mixture contains from 3 to 10% by weight by weight of units derived from alpha-olefin having from 4 to 10 carbon atoms, from 1 to 5% by weight of ethylene units and from 85 to 96% by weight of propylene units.

6. The process according to claim 1 wherein the second copolymer mixture contains from 75 to 96% by weight of the first copolymer mixture and from 4 to 25% by weight of the third polymer.

7. The process according to claim 1 wherein the first polymerization stage is conducted as a slurry polymerization, and wherein the mixture comprising particles of the first copolymer of propylene and the first fluid reaction mixture is a slurry of the first copolymer of propylene in the first fluid reaction mixture.

8. The process according to claim 7 wherein the first polymerization stage is conducted in a loop reactor.

9. The process according to claim 7 wherein the first monomer mixture contains from 0.05 to 2.0% by weight of ethylene, from 5 to 40% by weight of alpha-olefin(s) having from 4 to 10 carbon atoms and from 95 to 58% by weight of propylene.

10. The process according to claim 1 wherein the second polymerization stage is conducted in gas phase in a fluidized bed where the polymer particles are suspended in an upwards moving gas stream.

11. The process according to claim 7 wherein the second polymerization stage is conducted in gas phase in a fluidized bed and the stream of the slurry comprising the particles of first copolymer in the first fluid reaction mixture is introduced directly into the second polymerization stage and does not include a step of separating a part of the first fluid reaction mixture from the particles of the first copolymer.

12. The process according to claim 1 wherein the second fluid reaction mixture comprises from 50 to 95 mol-% propylene and has a ratio of ethylene to propylene of from 5 to 50 mol/kmol and a ratio of the alpha-olefins having from 4 to 10 carbon atoms to propylene of from 100 to 300 mol/kmol.

13. The process according to claim 1 wherein the second additional monomer mixture consists of from 93 to 99.5% by weight of propylene and from 0.5 to 7% by weight of ethylene.

14. The process according to claim 1 comprising the additional step of introducing a stream comprising the second copolymer mixture into a purge vessel where it is contacted with a purge gas at a temperature within the range of from 30 to 110° C. for an average residence time of from 5 to 240 minutes.

15. The process according to claim 1 wherein the polymerization catalyst comprises (i) a solid catalyst component comprising titanium and magnesium; (ii) a cocatalyst comprising trialkylaluminium; and (iii) an external donor comprising an organosilane compound containing Si—OCOR, Si—OR, or Si—NR$_2$ bonds, having silicon as the central atom, where R is an alkyl, alkenyl, aryl, arylalkyl or cycloalkyl with 1-20 carbon atoms.

16. The process according to claim 1 wherein the alpha-olefin having from 4 to 10 carbon atoms is 1-butene.

17. A process of copolymerizing propylene, ethylene and at least one alpha-olefin having from 4 to 10 carbon atoms in the presence of an olefin polymerization catalyst in three cascaded polymerization stages comprising the steps of:
(i) copolymerizing propylene, ethylene and the alpha-olefin having from 4 to 10 carbon atoms in a first polymerization stage by introducing a first monomer mixture consisting of propylene, ethylene and at least one alpha-olefin having from 4 to 10 carbon atoms, and said olefin polymerization catalyst into the first polymerization stage under conditions to polymerize propylene, ethylene and said at least one alpha-olefin on said olefin polymerization catalyst to produce a mixture comprising particles of a first copolymer of propylene and a first fluid reaction mixture;
(ii) withdrawing a first stream of the mixture comprising said particles of the first copolymer and said first fluid reaction mixture from the first polymerization stage and introducing it into a subsequent second polymerization stage;
(iii) introducing one first additional monomer mixture consisting of propylene, ethylene and optionally at least one alpha-olefin having from 4 to 10 carbon atoms into the second polymerization stage to copolymerize propylene, ethylene and the alpha-olefin to produce a mixture comprising particles of a first copolymer mixture of said first copolymer and a second copolymer and a second fluid reaction mixture;
(iv) withdrawing a second stream of the mixture of said particles of the first copolymer mixture and said second fluid reaction mixture from the second polymerization stage and introducing it into a third polymerization stage;
(v) introducing one second additional monomer mixture consisting of propylene and optionally ethylene into the third polymerization stage conducted in gas phase in a fluidized bed to polymerize the monomers in said second additional monomer mixture optionally with residual alpha-olefin remaining in said second stream in the third polymerization stage to produce particles of a second copolymer mixture of said first copolymer mixture and a third polymer where the particles of the second copolymer mixture are suspended in a third fluid reaction mixture in gas phase;
(vi) withdrawing a third stream comprising the second copolymer mixture and the third fluid reaction mixture from the third polymerization stage;
wherein the contents of propylene, ethylene and the alpha-olefin having from 4 to 10 carbon atoms in the first polymerization stage are adjusted so that the first copolymer contains from 5 to 15% by weight of units derived from alpha-olefin having from 4 to 10 carbon atoms, from 0.1 to 3% by weight of ethylene units and from 82 to 94.9% by weight of propylene units.

18. The process according to claim 17 wherein the contents of propylene, ethylene and the alpha-olefin having from 4 to 10 carbon atoms in the second polymerization stage are adjusted so that the first copolymer mixture contains from 4 to 12% by weight by weight of units derived from alpha-olefin having from 4 to 10 carbon atoms, from 0.5 to 5% by weight of ethylene units and from 83 to 95.5% by weight of propylene units.

19. The process according to claim 17 wherein the first copolymer mixture contains from 40 to 60% by weight of said first copolymer and from 60 to 40% by weight of said second copolymer.

20. The process according to claim 17 wherein the contents of propylene and ethylene in the third polymerization stage are adjusted so that the second copolymer mixture contains from 3 to 10% by weight by weight of units derived from alpha-olefin having from 4 to 10 carbon atoms, from 1 to 5% by weight of ethylene units and from 85 to 96% by weight of propylene units.

21. The process according to claim 17 wherein the second copolymer mixture contains from 75 to 96% by weight of the first copolymer mixture and from 4 to 25% by weight of the third polymer.

22. The process according to claim 17 wherein the first polymerization stage is conducted as a slurry polymerization, and wherein the mixture comprising particles of the first copolymer of propylene and the first fluid reaction mixture is a slurry of the first copolymer of propylene in the first fluid reaction mixture.

23. The process according to claim 22 wherein the first polymerization stage is conducted in a loop reactor.

24. The process according to claim 22 wherein the first monomer mixture contains from 0.05 to 2.0% by weight of ethylene, from 5 to 40% by weight of alpha-olefin(s) having from 4 to 10 carbon atoms and from 95 to 58% by weight of propylene.

25. The process according to claim 17 wherein the second polymerization stage is conducted in gas phase in a fluidized bed where the polymer particles are suspended in an upwards moving gas stream.

26. The process according to claim 22 wherein the second polymerization stage is conducted in gas phase in a fluidized bed and the stream of the slurry comprising the particles of first copolymer in the first fluid reaction mixture is introduced directly into the second polymerization stage and does not include a step of separating a part of the first fluid reaction mixture from the particles of the first copolymer.

27. The process according to claim 17 wherein the second fluid reaction mixture comprises from 50 to 95 mol-% propylene and has a ratio of ethylene to propylene of from 5 to 50 mol/kmol and a ratio of the alpha-olefins having from 4 to 10 carbon atoms to propylene of from 100 to 300 mol/kmol.

28. The process according to claim 17 wherein the second additional monomer mixture consists of from 93 to 99.5% by weight of propylene and from 0.5 to 7% by weight of ethylene.

29. The process according to claim 17 comprising the additional step of introducing a stream comprising the second copolymer mixture into a purge vessel where it is contacted with a purge gas at a temperature within the range of from 30 to 110° C. for an average residence time of from 5 to 240 minutes.

30. The process according to claim 17 wherein the polymerization catalyst comprises (i) a solid catalyst component comprising titanium and magnesium; (ii) a cocatalyst comprising trialkylaluminium; and (iii) an external donor comprising an organosilane compound containing Si—OCOR, Si—OR, or Si—$NR_2$ bonds, having silicon as the central atom, where R is an alkyl, alkenyl, aryl, arylalkyl or cycloalkyl with 1-20 carbon atoms.

31. The process according to claim 17 wherein the alpha-olefin having from 4 to 10 carbon atoms is 1-butene.

* * * * *